United States Patent
Meyer et al.

(10) Patent No.: US 12,525,059 B2
(45) Date of Patent: Jan. 13, 2026

(54) METHOD FOR ASCERTAINING AT LEAST ONE EYE STATE OF AT LEAST ONE PERSON SITUATED IN A DEFINED SPATIAL REGION

(71) Applicant: Robert Bosch GmbH, Stuttgart (DE)

(72) Inventors: Johannes Meyer, Haseluenne (DE); Johannes Fischer, Pliezhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 335 days.

(21) Appl. No.: 18/452,058

(22) Filed: Aug. 18, 2023

(65) Prior Publication Data

US 2024/0135749 A1    Apr. 25, 2024
US 2024/0233438 A9    Jul. 11, 2024

(30) Foreign Application Priority Data

Oct. 24, 2022  (DE) ..................... 10 2022 211 250.4

(51) Int. Cl.
*G06V 40/19* (2022.01)
*G06V 10/143* (2022.01)
*G06V 20/54* (2022.01)
*G06V 20/59* (2022.01)

(52) U.S. Cl.
CPC ............ *G06V 40/19* (2022.01); *G06V 10/143* (2022.01); *G06V 20/54* (2022.01); *G06V 20/59* (2022.01)

(58) Field of Classification Search
CPC ........ G06V 40/19; G06V 20/59; G06V 20/54; G06V 10/143; G02B 27/0093; A61B 3/10; A61B 3/113
See application file for complete search history.

(56) References Cited

U.S. PATENT DOCUMENTS

| | | | |
|---|---|---|---|
| 2010/0070988 A1 | 3/2010 | Cohen et al. | |
| 2010/0149073 A1* | 6/2010 | Chaum | G02B 27/0075 345/8 |
| 2012/0086645 A1 | 4/2012 | Zheng et al. | |
| 2015/0177831 A1* | 6/2015 | Chan | G02B 27/0172 345/156 |
| 2022/0244036 A1* | 8/2022 | Scheller | G01B 11/22 |

(Continued)

FOREIGN PATENT DOCUMENTS

| | | |
|---|---|---|
| DE | 102016210925 A1 | 12/2017 |
| DE | 102018214637 A1 | 3/2020 |
| DE | 102021207058 A1 | 1/2023 |

*Primary Examiner* — Syed Haider

(74) *Attorney, Agent, or Firm* — NORTON ROSE FULBRIGHT US LLP

(57) ABSTRACT

A method for ascertaining at least one eye state of at least one person situated in a defined spatial region. At least one light beam is directed, in a scanning manner, into the defined spatial region using a light source of a scanning laser feedback interferometry sensor. The defined spatial region has, in the horizontal direction, at least the dimension of a width of a head of the person. A modulation of the power of the light source of the laser feedback interferometry sensor is measured as a function of at least one light beam reflected back by at least one eye of the person situated in the defined spatial region. The at least one eye state of the at least one person situated in the defined spatial region is ascertained as a function of the modulation of the power of the light source, using a processing unit.

14 Claims, 3 Drawing Sheets

(56) References Cited

U.S. PATENT DOCUMENTS

| | | | | |
|---|---|---|---|---|
| 2022/0349703 A1* | 11/2022 | Spruit | ............... | G01S 7/4814 |
| 2022/0357583 A1* | 11/2022 | Ronen | ............... | G02B 6/42 |
| 2023/0333371 A1* | 10/2023 | Chen | ............... | G06V 40/197 |

* cited by examiner

METHOD FOR ASCERTAINING AT LEAST ONE EYE STATE OF AT LEAST ONE PERSON SITUATED IN A DEFINED SPATIAL REGION

CROSS REFERENCE

The present application claims the benefit under 35 U.S.C. § 119 of German Patent Application No. DE 10 2022 211 250.4 filed on Oct. 24, 2022, which is expressly incorporated herein by reference in its entirety.

FIELD

The present invention relates to a method for ascertaining at least one eye state of at least one person situated in a defined spatial region. In addition, the present invention relates to an optical system for ascertaining at least one eye state of at least one person situated in a defined spatial region, and to an optical system for use in a user monitoring system in a user environment.

BACKGROUND INFORMATION

A scanning system, in which a red-eye effect or a bright-pupil effect is utilized to ascertain a number of eyes in a region illuminated by infrared light, described in U.S. Patent Application Publication No. US 2010/0070988 A1. A detector positioned separately is used for detecting the reflected radiation.

An object of the present invention is to provide a simplified and space-saving method for ascertaining at least one eye state of at least one person situated in a defined spatial region.

SUMMARY

According to an example embodiment of the present invention, a method is provided for ascertaining at least one eye state of at least one person situated in a defined spatial region. Additionally provided according example embodiments of the present invention, are an optical system for ascertaining at least one eye state of at least one person situated in a defined spatial region, and an optical system for use in a user monitoring system in a user environment.

According to an example embodiment of the present invention, in the method for ascertaining at least one eye state of at least one person situated in a defined spatial region, at least one light beam is initially directed into the defined spatial region with the aid of a light source of a scanning laser feedback interferometry sensor. The defined spatial region, which represents, in this case, the scanning range of the scanning laser feedback interferometry sensor, as well, has at least the dimension of a width of a head of the person in the horizontal direction, in particular, a width of a facial surface of the person. After that, a modulation of the power, in particular, the laser power, of the light source of the laser feedback interferometry sensor is measured as a function of at least one light beam reflected back by at least one eye of the person situated in the defined spatial region. In other words, at least one light beam is emitted by the light source of the laser feedback interferometry sensor and cast upon an eye of a person within the defined spatial region. In this context, the laser beam is scattered back at least partially by the eye. In this case, the portion of the radiation, which is scattered by the eye, is parallel to the emitted laser beam, and may therefore be superposed with it, is regarded as scattered-back radiation. This scattered-back portion interferes with the incident laser beam, that is, with the laser beam propagating towards the eye. Using the so-called laser feedback interferometry, the emitted laser beam is superposed with the scattered-back radiation, so as to generate resulting radiation interference. This modulates the power, in particular, the laser power, of the light source of the laser feedback interferometry sensor. In a further method step, the at least one eye state of the at least one person situated in the defined spatial region is ascertained as a function of the measured modulation of the power of the light source, with the aid of a processing unit. The use of the laser feedback interferometry (LFI) sensor for the described method allows the eye state of the person situated within the defined spatial region to be ascertained in a compact and simple manner.

A direction of view of the at least one eye of the at least one person is preferably ascertained as an eye state. By this, one may deduce where the monitored person is currently directing his/her attention.

According to an example embodiment of the present invention, an interval between a first closing of a lid and, in particular, a second closing directly following it, of the at least one eye of the at least one person, is preferably ascertained as a function of the measured modulation of the power of the light source, with the aid of the processing unit. After that, the attention of the at least one person is determined as a function of the ascertained interval between the first and second closings of the lid, with the aid of the processing unit. If the interval between the two lid closings is comparatively large and lies above a defined threshold value, it may be assumed that the attention of the person with regard to the object in the direction of view is high. If the interval between the two lid closings is comparatively small and lies below a defined threshold value, it may be assumed that the attention of the person with regard to the object in the direction of view is low. In this connection, it is preferable for a plurality of intervals between, in particular, directly consecutive lid closings of the at least one eye of the at least one person to be ascertained. In this case, the attention of the at least one person is determined as a function of the plurality of ascertained intervals between, in particular, directly consecutive closings of the lid. The statistical significance of the ascertained attention of the person is increased by the plurality of ascertained intervals between lid closings.

The defined spatial area in the horizontal and/or vertical direction is preferably selected such that the at least one emitted light beam strikes, in a scanning manner, a plurality of, in particular, at least two, persons situated in the defined spatial region, and the eye states of the plurality of persons situated in the defined spatial region are ascertained with the aid of the processing unit as a function of the measured modulation of the power of the light source. Therefore, this spatial region and/or scanning range of the scanning laser feedback interferometry sensor allows a plurality of persons to be monitored. Thus, the method may be used in environments, where the eye states of a plurality of persons are to be determined. Examples of this are in the vicinity of billboards or even of an audience of a concert. In this connection, in addition to the ascertained eye states of the plurality of persons situated in the defined spatial region, the number of persons situated in the defined spatial region is initially determined with the aid of the processing unit. In other words, the number of persons situated in the defined spatial region at the time of determining the eye states may be ascertained. Consequently, e.g., assertions may be made for the purposes of statistical surveys. Thus, for example, an assertion may be made about how many spectators are actually in the concert hall, and if the billboard is set up in such a manner, that a sufficient number of persons may actually take note of it.

Further subject matter of the present invention includes an optical system for ascertaining at least one eye state of at least one person situated in a defined spatial region. In this connection, according to an example embodiment of the present invention, the optical system includes a scanning laser feedback interferometry sensor, which is configured to direct at least one light beam, in particular, in a scanning manner, into the defined spatial region with the aid of a light source of the scanning laser feedback interferometry sensor. In the horizontal direction, the defined spatial region has at least the dimension of a width of a head of the person, in particular, a width of a facial surface of the person. The laser feedback interferometry sensor preferably includes at least one rotationally mounted micromirror for the scanning of the emitted light beam. The laser feedback interferometry sensor is further configured to measure a modulation of the power, in particular, the laser power, of the light source of the laser feedback interferometry sensor as a function of at least one light beam reflected back by at least one eye of the person situated in the defined spatial region. In this connection, a detector, in particular, a photodiode, of the laser feedback interferometry sensor is preferably provided, which is positioned, in particular, in such a manner, that the light beam emitted and reflected back by the eye of the person strikes the photodiode. The detector is preferably positioned directly in front of the light source of the laser feedback interferometry sensor. In addition, the optical system includes a processing unit, which is configured to ascertain the at least one eye state of the at least one person situated in the defined spatial region, as a function of the modulation of the power of the light source.

The light source of the laser feedback interferometry sensor is preferably configured to emit at least one light beam in an infrared wavelength range. Consequently, the emitted light beam is not visible to the monitored person.

According to an example embodiment of the present invention, the processing unit is preferably integrated in the scanning laser feedback interferometry sensor. This has the advantage of being able to save space. As an alternative to this, the processing unit and the scanning laser feedback interferometry sensor are positioned separately from each other. This presents the option of being able to position the processing unit in, for example, an external server, and, consequently, to design the data processing to be separate from the data acquisition.

A further part of the present invention is the use of the above-described optical system in a user monitoring system in a user environment. A user environment means any environment, in which persons may use systems in the environment. In this connection, the user monitoring system may be used for acquiring data of the person in the user environment. These data may be acquired, for example, for statistical surveys, but may also have safety-related reasons.

According to an example embodiment of the present invention, the user environment preferably takes the form of a vehicle passenger compartment. In this case, the optical system is used, in particular, to determine the attention level of at least one person, in particular, the driver, in the passenger compartment as a function of the ascertained eye state. If, in particular, the driver is not paying any attention on this occasion, an accident may occur rapidly. Alternatively, the user environment takes the form of a billboard. In this context, the optical system is used, in particular, for statistical surveys. Thus, it is checked, for example, if the billboard is set up in such a manner, that a sufficient number of people actually look at, and therefore use, the billboard. As a further alternative, the user environment takes the form of a monitor, in particular, a computer monitor. In this connection, the optical system is used, in particular, for determining the attention of a user as a function of the ascertained eye state.

DETAILED DESCRIPTION OF EXAMPLE EMBODIMENTS

Figure 1:
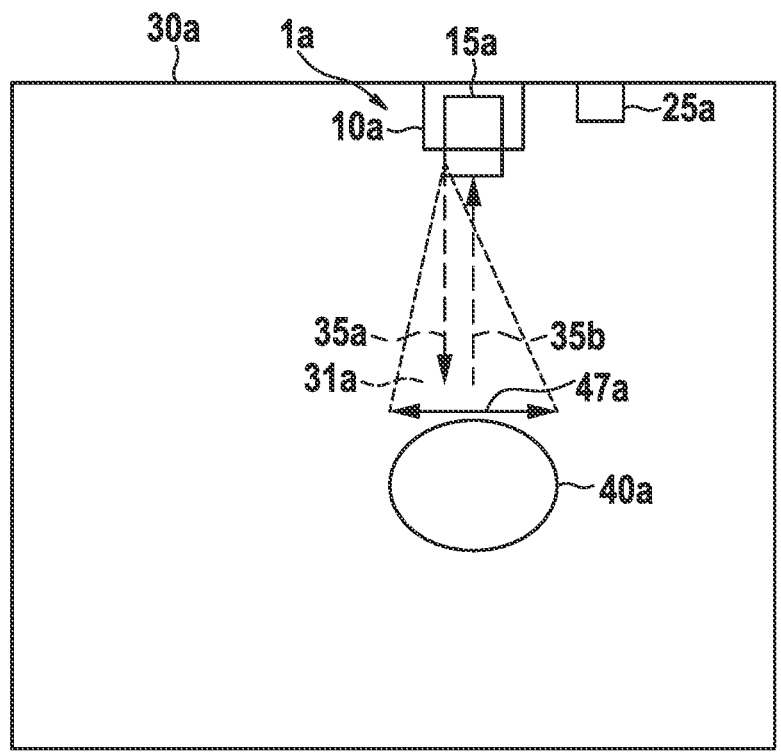
FIG. 1 shows an optical system for ascertaining at least one eye state of a person situated in a vehicle passenger compartment, according to an example embodiment of the present invention.

FIG. 1 schematically shows a plan view of an optical system 1*a* for ascertaining at least one eye state of at least one person 40*a* situated in a defined spatial region 31*a*. For this, optical system 1*a* includes a scanning laser feedback interferometry sensor 10*a*, which is configured to direct at least one light beam 35*a*, in particular, in a scanning manner, into defined spatial region 31*a* with the aid of a light source 15*a* of scanning laser feedback interferometry sensor 10*a*. In the horizontal direction, defined spatial region 31*a* has the dimension of a width 47*a* of a head of person 40*a*, in particular, a width of a facial surface of the person. In addition, laser feedback interferometry sensor 10*a* is used for measuring a modulation of the power, in particular, the laser power, of light source 15*a* of laser feedback interferometry sensor 10*a* as a function of at least one light beam reflected back by at least one eye of the person situated in the defined spatial region. In this connection, the laser feedback interferometry sensor 10*a* in this specific embodiment includes a detector 20*a*, which takes the form of a photodiode and is situated in the optical path of emitted light beam 35*a* and of the light beam 35*b* reflected back by the eye of person 40*a*. In addition, optical system 1*a* includes a processing unit 25*a*, which is positioned separately from laser feedback interferometry sensor 10*a* and is configured to ascertain the at least one eye state of the at least one person 40*a* situated in defined spatial region 31*a*, as a function of the modulation of the power of light source 15*a*.

In the specific embodiment represented in FIG. 1, optical system 1*a* is used for the user monitoring of a driver, in the form of a person 40*a*, situated in a passenger compartment 30*a*.

In this case, a plan view of vehicle passenger compartment 30*a* is represented schematically in a sectional drawing.

In the first exemplary embodiment, light source 15*a* of laser feedback interferometry sensor 10*a* is configured to emit the at least one light beam in an infrared wavelength range.

Figure 2:
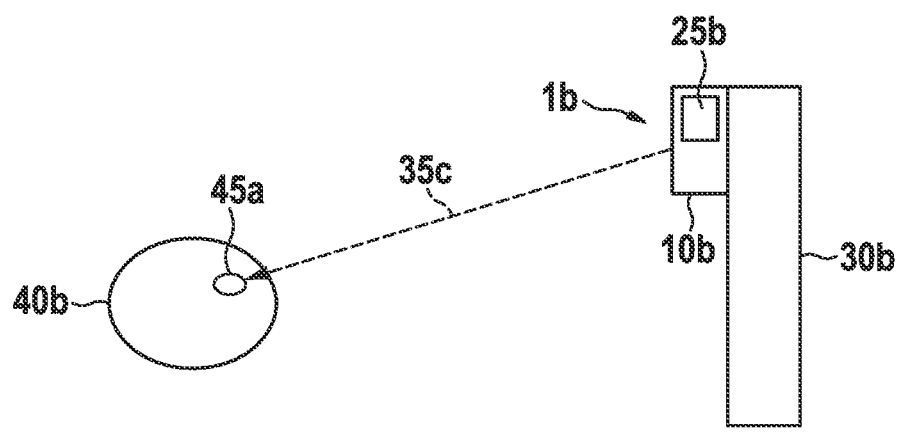
FIG. 2 shows an optical system for ascertaining at least one eye state of a person situated in front of a computer monitor, according to an example embodiment of the present invention.

FIG. 2 schematically shows a side view of a further application of an optical system 1*b* for ascertaining at least one eye state of at least one person 40*b* situated in a defined spatial region. The defined spatial region is not shown here. In this exemplary embodiment, the defined spatial region is defined as a region in front of a computer monitor 30*b*. In this case, in contrast to the first specific embodiment, processing unit 25*b* of optical system 1*b* is integrated in laser feedback interferometry sensor 10*b*. In this case, as well, the light source, not shown here, of laser feedback interferometry sensor 10*b* directs at least one light beam 35*c* into the defined spatial region; the light beam being reflected back by eye 45*a*. In the application shown, optical system 1*b* is used, in particular, to determine the attention of the person 40*b* in front of computer monitor 30*b*.

Figure 3:
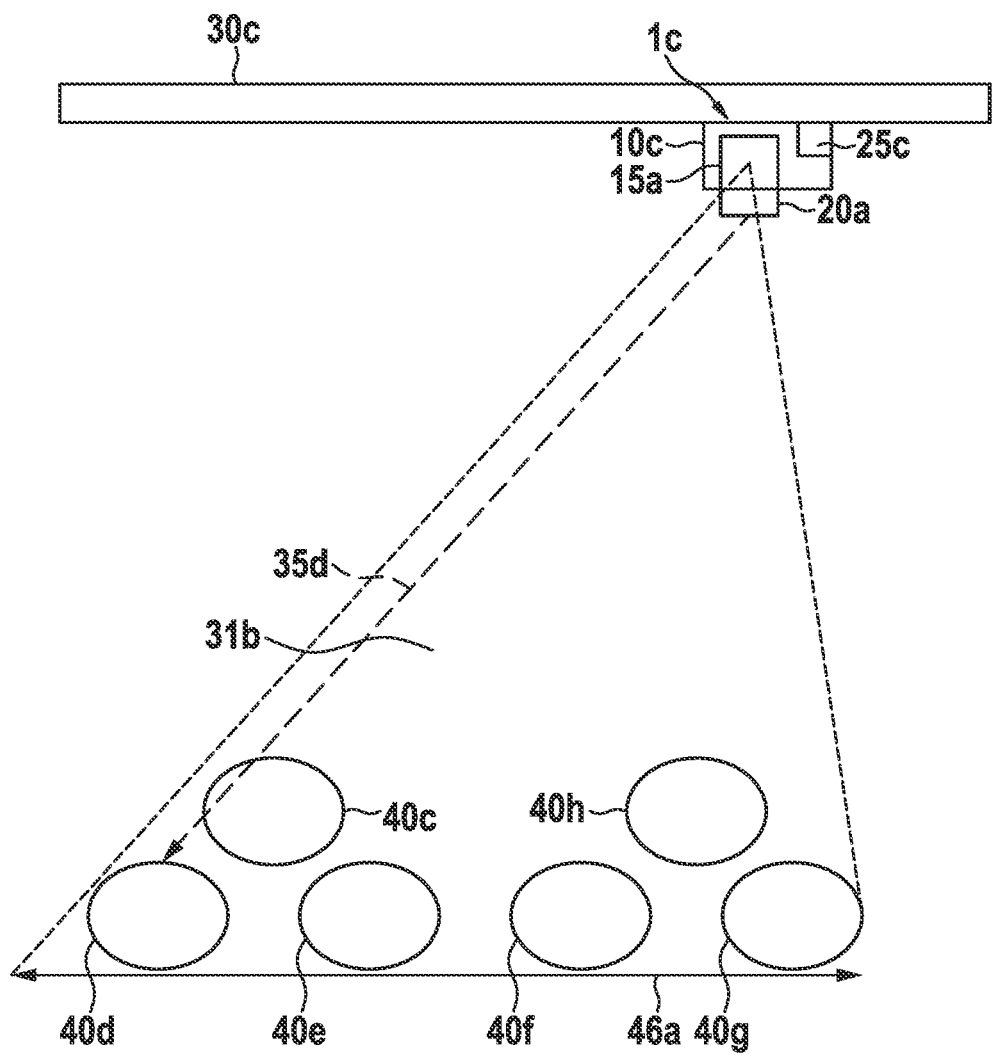
FIG. 3 shows an optical system for ascertaining the eye states of a plurality of persons situated in front of a billboard, according to an example embodiment of the present invention.

FIG. 3 schematically shows a plan view of a further application of an optical system 1*c* for ascertaining at least one eye state of at least one person 40*a* situated in a defined spatial region 31*b*. In this connection, defined spatial region 31*b* is defined as a region in front of a billboard 30*c*. In contrast to the above-described exemplary embodiments, in this case, in horizontal direction 46*a*, spatial region 31*b* is selected in such a manner, that the at least one emitted light beam 35*d* strikes, in a scanning manner, a plurality of persons 40*c* through 40*h* situated in defined spatial region 31*b*. In the application shown, optical system 1*c* is used, in particular, to ascertain the total number of persons 40*c* through 40*h* situated in front of billboard 30*c*, as well as their current level of attention. Thus, it is checked, for example, if billboard 30*c* is set up in such a manner, that a sufficient number of people 40*c* through 40*h* actually look at, and therefore use, billboard 30*c*.

Figure 4:
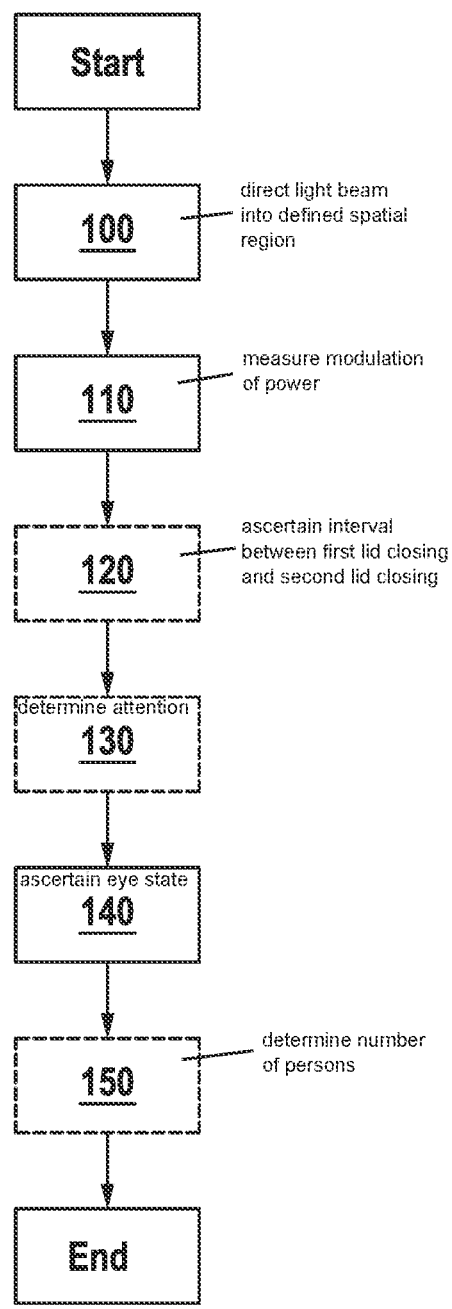
FIG. 4 shows a method for ascertaining at least one eye state of at least one person situated in a defined spatial region, according to an example embodiment of the present invention.

FIG. 4 shows, in the form of a flow chart, a method for ascertaining at least one eye state of at least one person situated in a defined spatial region. In this connection, in one method step 100, at least one light beam is directed into the defined spatial region with the aid of a light source of a scanning laser feedback interferometry sensor. In this case, the defined spatial region has, in the horizontal direction, at least the dimension of a width of a head of the person, in particular, a width of a facial surface of the person. In a method step 110 following method step 100, a modulation of the power, in particular, the laser power, of the light source of the laser feedback interferometry sensor is measured as a function of at least one light beam reflected back by at least one eye of the person situated in the defined spatial region. In particular, a detector, in particular, a photodiode, situated in the optical path of the light beam emitted and the light beam reflected back by the eye of the person, is used for this. In a method step 140 following method step 110, the at least one eye state of the at least one person situated in the defined spatial region is ascertained as a function of the measured modulation of the power of the light source, with the aid of a processing unit. After that, the method is ended.

Optionally, a direction of view of the at least one eye of the at least one person is ascertained as the at least one eye state.

In an optional method step 120 following method step 110, an interval between a first lid closing and a second lid closing following it, of the at least one eye of the at least one person is ascertained as a function of the measured modulation of the power of the light source, with the aid of the processing unit. In a following method step 130, the attention of the at least one person is determined with the aid of the processing unit as a function of the ascertained interval between the first and second closings of the lid. In this connection, as a further option, a plurality of intervals between consecutive lid closings of the at least one eye of the at least one person is ascertained in method step 120. After that, in method step 130, the attention of the at least one person is determined as a function of the plurality of ascertained intervals between consecutive closings of the lid.

As a further option, the defined spatial region in the horizontal and/or vertical direction is selected such that the at least one emitted light beam strikes, in a scanning manner, a plurality of, in particular, at least two, persons situated in the defined spatial region. Then, in method step 140, the eye states of the plurality of persons situated in the defined spatial region are ascertained with the aid of the processing unit, as a function of the modulation of the power of the light source. In a further, optional method step 150 following method step 140, in addition to the ascertained eye states of the plurality of persons situated in the defined spatial region, the number of persons situated in the defined spatial region is determined with the aid of the processing unit.

What is claimed is:

1. A method for ascertaining at least one eye state of at least one person situated in a defined spatial region, the method comprising the following steps:
   directing including scanning, at least one light beam into the defined spatial region using a light source of a scanning laser feedback interferometry sensor, wherein, in a horizontal direction, the defined spatial region has at least a dimension of a width of a head of the person including a width of a facial surface of the person;
   measuring a modulation of a laser power of the light source of the laser feedback interferometry sensor as a function of at least one light beam reflected back by at least one eye of the person situated in the defined spatial region; and
   ascertaining the at least one eye state of the at least one person situated in the defined spatial region, as a function of the modulation of the power of the light source, using a processing unit.

2. The method as recited in claim 1, wherein a direction of view of the at least one eye of the at least one person is ascertained as the at least one eye state.

3. The method as recited in claim 1, further comprising the following steps:
   ascertaining an interval between a first and a following second lid closing of the at least one eye of the at least one person as a function of the modulation of the power of the light source using the processing unit; and
   determining an attention of the at least one person as a function of the ascertained interval between the first and second closings of the lid, using the processing unit.

4. The method as recited in claim 3, wherein a plurality of intervals between consecutive lid closings of the at least one eye of the at least one person are ascertained; and the attention of the at least one person is determined as a function of the plurality of ascertained intervals between consecutive lid closings.

5. The method as recited in claim 1, wherein in the horizontal and/or vertical direction, the defined spatial region is selected such that the at least one light beam strikes, in a scanning manner, a plurality of persons situated in the defined spatial region; and eye states of the plurality of persons situated in the defined spatial region are ascertained using the processing unit, as a function of the modulation of the power of the light source.

6. The method as recited in claim 5, wherein, in addition to the ascertained eye states of the plurality of persons situated in the defined spatial region, a number of persons situated in the defined spatial region is ascertained using the processing unit.

7. An optical system configured to ascertain at least one eye state of at least one person situated in a defined spatial region, the system comprising:
    a scanning laser feedback interferometry sensor, which is configured to direct at least one light beam in a scanning manner into the defined spatial region using a light source of the scanning laser feedback interferometry sensor, wherein, in a horizontal direction, the defined spatial region has at least a dimension of a width of a head of the person including a width of a facial surface of the person, the scanning laser feedback interferometry sensor also being configured to measure a modulation of a laser power of the light source of the laser feedback interferometry sensor as a function of at least one light beam reflected back by at least one eye of the person situated in the defined spatial region; and
    a processing unit configured to ascertain the at least one eye state of the at least one person situated in the defined spatial region as a function of the modulation of the power of the light source.

8. The optical system as recited in claim 7, wherein the light source of the laser feedback interferometry sensor is configured to emit at least one light beam in an infrared wavelength range.

9. The optical system as recited in claim 7, wherein the processing unit is integrated in the scanning laser feedback interferometry sensor.

10. The optical system as recited in claim 7, wherein the processing unit and the scanning laser feedback interferometry sensor are positioned separately from each other.

11. The optical system according to claim 7, wherein the optical system is configured for use in a user monitoring system in a user environment.

12. The optical system as recited in claim 11, wherein the user environment is a vehicle passenger compartment.

13. The optical system as recited in claim 11, wherein the user environment is a billboard.

14. The optical system as recited in claim 11, wherein the user environment is a computer monitor.

* * * * *